US008110793B2

(12) United States Patent
Zubarev et al.

(10) Patent No.: US 8,110,793 B2
(45) Date of Patent: Feb. 7, 2012

(54) TANDEM MASS SPECTROMETRY WITH FEEDBACK CONTROL

(75) Inventors: Roman Zubarev, Uppsala (SE); Mikhail Savitski, Uppsala (SE); Michael Lund Nielsen, Uppsala (SE)

(73) Assignee: Bruker Daltonik GmbH, Bremen (DE)

( * ) Notice: Subject to any disclaimer, the term of this patent is extended or adjusted under 35 U.S.C. 154(b) by 631 days.

(21) Appl. No.: 11/403,555

(22) Filed: Apr. 13, 2006

(65) Prior Publication Data

US 2006/0255259 A1 Nov. 16, 2006

(30) Foreign Application Priority Data

Apr. 20, 2005 (DE) ......................... 10 2005 018 273

(51) Int. Cl.
*B01D 59/44* (2006.01)

(52) U.S. Cl. ........................................ 250/282; 250/281

(58) Field of Classification Search ........... 250/281–300
See application file for complete search history.

(56) References Cited

U.S. PATENT DOCUMENTS 5,572,025 A * 11/1996 Cotter et al. .................. 250/292
5,625,184 A * 4/1997 Vestal et al. .................. 250/287
5,696,376 A * 12/1997 Doroshenko et al. ......... 250/292
5,811,800 A * 9/1998 Franzen et al. ............... 250/288
6,051,378 A * 4/2000 Monforte et al. ............ 435/6.12
6,348,688 B1 * 2/2002 Vestal ........................... 250/287
6,468,748 B1 * 10/2002 Monforte et al. ............ 435/6.12
6,744,040 B2 * 6/2004 Park .............................. 250/281
6,797,516 B1 * 9/2004 Chen et al. ...................... 436/37
6,914,239 B2 * 7/2005 Yoshinari et al. ............. 250/281
6,940,065 B2 * 9/2005 Graber et al. ................. 250/282
6,963,807 B2 * 11/2005 Townsend et al. .............. 702/27
6,982,414 B2 * 1/2006 Bateman et al. .............. 250/282
7,034,292 B1 * 4/2006 Whitehouse et al. ......... 250/289
7,078,679 B2 * 7/2006 Westphall et al. ............ 250/287
7,112,784 B2 * 9/2006 Bateman et al. .............. 250/282
7,198,893 B1 * 4/2007 Koster et al. ................. 435/6.16
7,271,384 B2 * 9/2007 Sander .......................... 250/282
7,473,892 B2 * 1/2009 Sano et al. .................... 250/281
2002/0042112 A1 * 4/2002 Koster et al. .................. 435/174
2002/0102610 A1 * 8/2002 Townsend et al. ............. 435/7.1
2003/0042412 A1 * 3/2003 Park ............................... 250/281
2003/0129589 A1 * 7/2003 Koster et al. ...................... 435/6
2003/0162221 A1 * 8/2003 Bader et al. .................... 435/7.1
2004/0041091 A1 * 3/2004 Bateman et al. .............. 250/282
2004/0096982 A1 * 5/2004 Barnea et al. ................. 436/173
2004/0108452 A1 * 6/2004 Graber et al. ................. 250/281
2005/0116162 A1 * 6/2005 Vestal ........................... 250/287
2005/0124010 A1 * 6/2005 Short et al. ................... 435/7.23
2005/0127288 A1 * 6/2005 Sander .......................... 250/281
2005/0242279 A1 * 11/2005 Verentchikov ................ 250/287
2006/0043285 A1 * 3/2006 Laskin et al. ................. 250/288
2006/0148093 A1 * 7/2006 Gygi et al. .................... 436/173

FOREIGN PATENT DOCUMENTS

EP 0 360 677 A1 3/1990
GB 2375654 A 11/2002

* cited by examiner

*Primary Examiner* — Robert Kim
*Assistant Examiner* — Andrew Smyth
(74) *Attorney, Agent, or Firm* — Law Offices of Paul E. Kudirka

(57) ABSTRACT

The invention relates to acquisition methods for fragment ion spectra of biopolymer molecules in tandem mass spectrometers which are coupled to separation devices. The invention provides a real-time method for calculating a quality coefficient for each fragment ion spectrum. The quality coefficient indicates whether the fragment ion spectrum can be used successfully for identifying the biopolymer molecule or whether it should be acquired once more, possibly with other acquisition parameters.

8 Claims, No Drawings

TANDEM MASS SPECTROMETRY WITH FEEDBACK CONTROL

FIELD OF THE INVENTION

The invention relates to acquisition methods for fragment ion spectra of biopolymer molecules in tandem mass spectrometers which are coupled to separation devices.

BACKGROUND OF THE INVENTION

Current mass spectrometric research into biopolymers such as peptides, proteins and genetic material is frequently coupled with fast separation methods such as liquid chromatography (HPLC or simply LC) or capillary electrophoresis (CE). The objective here is often to fragment biopolymer ions in the mass spectrometer in order to obtain information about the sequences of the biopolymer building blocks; for peptides and proteins this means information about the sequence of the amino acids. Therefore, fragment ion spectra have to be acquired. The mass spectrometers required for this are known as "tandem mass spectrometers". The methods of acquiring fragment ion spectra with tandem mass spectrometers are often abbreviated to MS/MS.

Tandem mass spectrometers comprise an initial mass spectrometer to select ions of a certain type, a fragmentation device, in which these ions are fragmented, and another mass spectrometer to analyze the fragment ions. In ion trap mass spectrometers, these processes for selecting, fragmenting and analyzing the fragment ions can be performed time-sequentially in the same ion trap. This is then termed "tandem-in-time", in contrast to "tandem-in-space" in the case of spatially separated mass spectrometers.

In proteomics it is frequently necessary to analyze thousands of peptides which have been obtained from an enzymatic digest of a complex protein mixture. If in the following the objective of the invention is described, it is particularly with respect to these very complex peptide mixtures.

The upstream separation for the biopolymers provides a certain analyte substance, in this specific case a digest peptide, for only a few seconds to the mass spectrometer. For such cases, several commercial companies supply tandem mass spectrometers equipped with measurement procedures for the automatic acquisition of fragment mass spectra. Mass spectra are acquired in continuous sequence, between one and twenty mass spectra per second in fast mass spectrometers, for example. For each mass spectrum, an evaluation program is then used to determine in real time whether, if at all, one or several digest peptides are provided in sufficient concentration. With the complex mixtures described above, several digest peptides are often supplied at the same time; frequently even as many as ten to twenty digest peptides simultaneously.

In this case, a real time mathematical analysis of the mass spectrum is carried out first to select which ionic species is to be fragmented for the acquisition of a fragment ion spectrum. Doubly charged ions are best suited to fragmentation, and therefore the most intensive ionic species which occurs with a double charge within a predetermined mass range, not occurring in an exclusion table, is generally used. The exclusion table contains the mass values of those peptides which have already been analyzed in previous measuring cycles or which have been marked as not of interest from the outset. This is followed by a further spectrum acquisition in which the ionic species selected is isolated by separation in the first mass spectrometer and fragmented in the fragmentation stage; the fragment ions are then measured as a fragment ion spectrum. There are various methods of fragmentation whose parameters are generally set blind to the settings that have, on average, proven favorable for ions of a digest peptide of the mass in question.

The various parameters for the fragmentation method differ widely for different mass spectrometers and different types of fragmentation. A widely used fragmentation method is collisionally induced fragmentation (CID), in which collisions with a collision gas transfer energy to the ion. Depending on the collision energy, this may lead to a fragmentation after just one collision, or it may require a large number of collisions resulting in different types of fragment ion spectra. Another type of fragmentation, offered in some mass spectrometers, is the fragmentation by low-energy electrons, either by direct bombardment or by transfer of the electrons from negatively charged ions or highly excited neutral particles (ECD=electron capture dissociation; ETD=electron transfer dissociation, MAID=metastable atom-induced dissociation). For these types of fragmentation by electrons, the only parameters are those of the electron density used and the irradiation time.

In mass spectrometers equipped with quadrupole collision cells, the fragmentation parameters are, in particular, the collision energy with which the selected ions are injected into the gas-filled collision cell and, in some mass spectrometers, also the type of collision gas, which cannot be changed quickly, and certainly not from spectrum acquisition to spectrum acquisition. These instruments with collision cell include the triple quadrupole mass spectrometer (generic abbreviation QqQ), and also certain types of time-of-flight mass spectrometer with orthogonal ion injection (generic abbreviation QqOTOF). With time-of-flight mass spectrometers with orthogonal ion injection it is also possible to change the duration of the spectrum acquisition, because they acquire individual spectra with high spectrum acquisition rate and continuously add the spectra together to form a single sum spectrum.

For mass spectrometers comprising RF quadrupole ion traps, in which a collisionally induced fragmentation is carried out using helium as the damping and fragmentation gas, there are essentially only two parameters: filling time and fragmentation time. The excitation RF voltage level here is always chosen so that the selected ions excited to oscillations just avoid hitting the end cap electrodes. This excitation RF voltage is therefore not generally available as a variable parameter.

Unfortunately it very often appears when using these fragment ion spectra in identity and structure searches by "search engines" in protein sequence databases, the quality of the spectra is not sufficiently high. Analyses show that, in some types of mass spectrometer, the proportion of fragment ion spectra with adequate quality is frequently no more than ten percent. In a three-hour run of a single liquid chromatographic separation with mass spectrometric analysis, some 20,000 to 60,000 fragment ion spectra can be acquired, and so the absolute number of 2,000 to 6,000 qualitatively good spectra often seems to be pleasingly high; however, the analytical objective of recording as many analyte substances as possible is by far not adequately achieved. The same occurs with capillary electrophoretic separation.

Under the best conditions available in tandem mass spectrometry, 20 to 30 percent of the spectra obtained have sufficient quality, still a very low and unsatisfying proportion.

SUMMARY OF THE INVENTION

The invention uses a fast real-time calculation of a quality coefficient to estimate whether a fragment ion spectrum of a biopolymer ion should be recorded a second time, possibly under different fragmentation conditions. The quality coefficient considers the chances of identifying the biopolymer via the fragment ion spectrum. It corresponds essentially to the longest chain of polymer building blocks. In the case of the digest peptides this means the longest chain of amino acids which can be found in the fragment spectrum. It is not only amino acids as such which are considered for the chain of building blocks, but also the most frequently occurring modifications of the amino acids, which are usually found in the proteome.

To calculate the quality coefficient, the signals of the fragment ion spectrum must first be transformed into a table of mass values. To save time, this table is preferably compiled only for signals above an intensity threshold, and even for these signals only the mass value of the signal maximum, which is quickly determined, is calculated. For groups of isotopes, only the mass of the monoisotopic signal is entered into the table. For multiply charged ions, which can be easily recognized from the spacing of the mass values of their isotope signals, preferably only the mass values of the singly charged ions are calculated and entered into the table. By using a calibration curve which is already known, the calculation of this table takes only milliseconds or less. This quickly derived table of mass values of solely singly charged fragment ions is used to determine the quality parameter.

The quality parameter is determined successively from the differences between one mass value and other mass values, beginning with the smallest or largest mass value. To save time it is not necessary to search for the longest chain of polymer building blocks of all; it suffices if a length is found which represents the minimum for a good identification.

To further save time for the search of mass differences indicating amino acids, it is possible to use a check mass table in which for every possible mass difference value an entry indicates whether an amino acid or a short chain of amino acids exists for this mass difference value. The check mass table also contains entries for modified amino acids. The entries are either zeros (no chain possible) or may be low numbers which, when added together, give the quality coefficient for a closed chain. "Closed chain" means a chain which may lack the mass difference for a simple amino acid, but which is able to be continued over a gap exactly corresponding to two or three amino acids. The numerical values of the entries can thus take into account the presence of gaps. For example, a "three" can be entered for mass differences which correspond to individual amino acids and their modifications, while for two amino acids attached to each other and their modifications just a "two", and for three amino acids attached to each other just a "one".

The gradation of the mass values used for the table depends on the mass accuracy of the tandem mass spectrometer concerned. If the mass accuracy is 0.005 atomic mass units (Dalton), for example, then the table can be graduated in mass values of one hundredth of a Dalton. If the table only considers chain lengths of up to two amino acids and their modifications, then the mass values must cover around 500 Daltons. The table will therefore be 50,000 entries long.

The quality coefficient of the longest closed chain determines whether the fragment ion spectrum should be measured again. If the quality coefficient lies below a very small first threshold value, this usually means that the spectrum under consideration is probably not a fragment spectrum of a biopolymer ion at all. It is then not worth doing a new measurement. Somewhat larger quality coefficients, but still below an second threshold value, indicate that a repeat measurement is promising, possibly by applying other fragmentation parameters. Quality coefficients above the second threshold indicate that the quality of the fragment ion spectrum is adequate.

DETAILED DESCRIPTION

The invention calculates a quality coefficient in real time in order to evaluate whether a second fragment ion spectrum of a biopolymer ion should be recorded under better fragmentation conditions. The purpose of the quality coefficient is to quantify the likelihood of identifying the biopolymer via the fragment ion spectrum. To obtain the quality coefficient, a number is determined which is essentially proportional to the length of the longest closed chain of polymer building blocks. Here a "closed chain" means a chain in which the ion signals for one or two polymer building blocks may be missing, provided that this chain can be traced further beyond this gap. A "tightly closed chain" means a chain which has no such gaps.

In the following, the description is essentially limited to mixtures of digest peptides. However, it is not intended to exclude a larger generality. Not only digest peptides or proteins are involved, and consequently for a greater generality, the term "amino acids" must always be read as "polymer building blocks".

In the case of digest peptides, the quality coefficient can simply be the number of amino acids which form the longest detectable closed chain in the fragment spectrum, for example. The chain thereby must not only cover pure amino acids, but also the most frequently occurring modifications of the amino acids which are usually found in the proteome.

To calculate the quality coefficient, the signals of the fragment ion spectrum must first be used to compile a table of the mass values of these signals. Because there is usually not much time available for this calculation, this table is compiled only for signals above an intensity threshold. For all signals above this threshold, only the mass value of the signal maximum, which can be quickly determined, is calculated. Groups of isotopes are reduced to the mass of the monoisotopic signal in the familiar way. Here, the intensity ratio of the first two isotope signals can be used for a plausibility check. This check examines in a very simple way whether mass and charge state can agree. The intensity ratio of the first two ion signals of a group of isotopes is around 2:1 for peptides with a mass of 1,200 Daltons, for those with a mass of 2,400 Daltons around 1:1, for those with a mass of 4,800 Daltons around 1:2, the two next heaviest isotope signals here being larger than the first two, however.

For multiply charged ions, which can be identified from the spacing of the mass values of their isotope signals, it is expedient if only the mass values of the singly charged ions, which are easily calculated, are entered into the table. For a doubly charged ion, for example, double the measured mass value minus the mass of a proton is entered. This table of the "virtual" mass values of solely singly charged, monoisotopic fragment ions is used to determine the quality parameter.

To calculate the quality parameter one begins, for example, with the smallest mass value in the table. (One can also proceed from the ion signal with the largest mass or from the mass of the fragmented biopolymer ion). The mass differences of a few next mass values are calculated and a check is then made as to whether one of these mass differences can be assigned to an amino acid or a modification of an amino acid. If this is the case, the quality parameter is increased, and the differences of this next mass value of the chain from a few larger mass values are calculated and checked again. The quality parameter is increased until the chain breaks off. If this chain is long enough for the purposes of the invention, i.e. for the possible identification, the procedure can be discontinued, as there is no necessity to measure the fragment ion spectrum again. But it is also possible to follow the chain to the end, in order to store this quality parameter together with the fragment spectrum for later use.

If the chain breaks off too soon, then one returns to a mass value in the chain which has not yet been considered and begins a new calculation of the quality parameter from there.

The mass differences to be calculated in each case are only calculated to a maximum mass difference each time. If the chain is tightly closed, then the mass differences only have to be calculated up to the highest mass of an amino acid or its modification. If gaps beyond an amino acid are also to be taken into consideration, then correspondingly larger mass differences must also be calculated.

A check mass table can be used to save time in examining whether for a particular mass difference an amino acid, a modification or even a short chain made up of two amino acids or modifications exist. For every value of a possible mass difference, this check mass table contains an entry as to whether there is an amino acid or a short chain of amino acids or their modifications for this value. The gradation of the mass values used for the check table depends on the mass accuracy of the tandem mass spectrometer concerned. If the mass accuracy is 0.01 Daltons (this is a different example to the one above for a mass spectrometer with a different resolution), for example, then the table can be graduated in mass values of 0.02 Daltons. If the table only considers chain lengths up to two amino acids and their modifications, then the mass values must cover around 500 daltons. The check mass table will therefore be 25,000 entries long.

There are twenty amino acids which must be considered for the check mass table. If combinations of two amino acids are also taken into consideration each time, this results in 400 positive entries. If, in addition, the ten or so most prevalent modifications are taken into consideration, this results in roughly 1,000 positive entries. For a purely random mass difference, there is then a probability of 1/25 (4%) that there is an incorrect assignment. For a chain of two amino acids this probability is already drastically reduced; for three successive assignments there is hardly any likelihood of an incorrect assignment.

Modifications are taken here to mean oxidation of methionine, the phosphorylation of cystine, base glycolizations, methylations, amidations of appropriate amino acids and the like. Corresponding modifications or derivatives can also occur with other biopolymer building blocks.

The entries in this one-dimensional check mass table are either zeros, if the mass difference does not correspond to any known building block, building block modification, or short chain of building blocks. Or the entries are low numbers which represent, for example, the number of amino acids and which, when added together, produce the quality coefficient. The quality values then correspond directly to the length of the chain. The table entry is then a "one" for a single amino acid, but "two" in the case of the mass difference of two amino acids or their modifications.

The numerical values of the entries can also take into account the presence of gaps in another way, particularly with lower weight, if such gaps are viewed as being slightly inadequate for the fragment spectrum. For example, a "three" can be entered for a mass difference which corresponds to one individual amino acid or its modification, while for two amino acids attached to each other or their modifications just a "two", and for three amino acids attached to each other just a "one" is entered into the check mass table. The presence of gaps then has the effect of reducing the quality coefficient. A tightly closed chain thus gains a better quality coefficient than a closed chain with gaps.

In detail, every calculation of a mass difference is immediately followed by a check in the table, so that after a positive assignment there is no need for a useless calculation of further mass differences.

The quality coefficient of a closed chain determines whether the fragment ion spectrum should be measured again. If the quality coefficient lies below a first threshold value, this usually means that the spectrum under consideration is probably not a fragment spectrum of a biopolymer ion at all. If, for example, not a single mass difference, or only one, is found which may correspond to an amino acid (and which in the above example can, of course, wrongly be designed as an amino acid in 2.5 percent of all cases) but, on the other hand, there is a sufficient number of mass entries, then it is highly probable that no digest peptide is present. Quality coefficients which are slightly larger but still below a second threshold, for example a quality coefficient which only indicates a chain of two or three amino acids, suggest that a repeat measurement with other fragmentation parameters is promising.

As a rule of thumb, quality coefficients which require no repeat measurement will preferably indicate at least a tightly closed chain of at least three amino acids or their modifications, or a closed chain with gaps but containing at least four amino acids or their modifications.

The modern types of liquid chromatography, including nano LC, provide peak widths of some five to twenty seconds. An analyte substance is therefore available for several seconds. Modern mass spectrometers, which can usually acquire several fragment ion spectra per second, therefore offer the possibility of remeasuring fragment ion spectra which are promising but not good enough. The quality coefficient can be calculated while another fragment ion spectrum of another analyte substance is being measured. Capillary electrophoresis also makes the substances available for several seconds.

However, the separation method does not have to be coupled necessarily with the mass spectrometer directly in order to be able to benefit from the present invention. A measurement procedure being used more and more frequently is the non-direct coupling of liquid chromatography with a MALDI mass spectrometer ("LC MALDI"). The mass spectrometer ionizes solid samples on a sample support by matrix-assisted laser desorption. Here, the eluent from the liquid chromatograph is put in many individual droplets on pre-prepared sample supports, which can accommodate hundreds or even thousands of samples. The sample droplets are dried and then fed into the mass spectrometer.

In this case as well, the quality of a fragment ion spectrum can only be evaluated when the spectrum has been subjected to a search procedure in a protein sequence database. However, this generally requires such long computer times that a real-time search during the measurements in the mass spectrometer is out of question. Here too, the quality coefficient can assist in assessing the suitability of the fragment ion spectrum and, where necessary, immediately initiating a new measurement.

Fragment ion spectra which have been measured again can then be added to the fragment ion spectra of the same analyte substance measured earlier to provide spectra with a better signal-to-noise ratio. It is irrelevant here whether the separation method was directly coupled or not.

If more than one type of fragmentation is used for a peptide ion, and they produce different types of chain cleavage then, as every specialist knows, there are firm mass differences between corresponding ion signals in the various fragment ion spectra. From the presence of these firm mass differences it is easy to obtain further contributions for the quality coefficient.

On the whole, with knowledge of this invention, those skilled in the art will be able to undertake further modifications of the methods.

What is claimed is:

1. Method for the acquisition of a fragment ion spectrum of biopolymer ions in a tandem mass spectrometer, comprising the following steps:

a) acquiring a first fragment ion spectrum of a biopolymer ion using a fragmentation method with first fragmentation method parameters, b) calculating a quality coefficient in real time from the first fragmention ion spectrum data, wherein the quality coefficient corresponds to a length of a chain of polymer building blocks inferred from signals of the first fragment ion spectrum data, c) deciding from the value of the quality coefficient, whether a further fragment ion spectrum of this biopolymer ion is to be acquired, and d) in case of a positive decision, immediately reacquiring a second fragment ion spectrum of a biopolymerion of a same type as that used in step (a) using the same fragmentation method used in step (a) with second fragmentation method parameters that differ from the first fragmentation method parameters.

2. Method according to claim 1, wherein the tandem mass spectrometer measures samples of biopolymers which have been separated by a separation method such as liquid chromatography or capillary electrophoresis.

3. Method according to claim 2, wherein the tandem mass spectrometer is directly coupled to the separation method.

4. Method according to claim 1, wherein the biopolymer ions are digest peptide ions.

5. Method according to claim 1, wherein the calculation of the quality coefficient comprises the steps:

calculation of the mass values of the fragmentions in the fragment spectrum, and examining the mass differences of these mass values for coincidences with masses of biopolymer building blocks, of biopolymer building block modifications, or of short chains of biopolymer building blocks.

6. Method according to claim 5, wherein the mass differences can be checked for coincidences by means of a check mass table, having positive entries for all possible mass values for single polymer building blocks, polymer building block modifications, or short chain of polymer building blocks with and without possible modifications.

7. Method according to claim 6, wherein the graduation of the mass values in the check mass table is as fine as the measuring accuracy of the mass spectrometer allows.

8. Method according to claim 6, wherein the sum of the entries in the check table gives the quality coefficient for the longest closed chain.

* * * * *